(12) United States Patent
Yu et al.

(10) Patent No.: US 8,550,665 B2
(45) Date of Patent: Oct. 8, 2013

(54) BACKLIGHT UNIT AND DISPLAY DEVICE INCLUDING THE SAME

(75) Inventors: Dong Kug Yu, Seoul (KR); Sung Yong Park, Seoul (KR); Young Bae Jang, Seoul (KR)

(73) Assignee: LG Innotex Co., Ltd., Seoul (KR)

( * ) Notice: Subject to any disclaimer, the term of this patent is extended or adjusted under 35 U.S.C. 154(b) by 246 days.

(21) Appl. No.: 13/114,776

(22) Filed: May 24, 2011

(65) Prior Publication Data

US 2011/0292682 A1 Dec. 1, 2011

(30) Foreign Application Priority Data

May 25, 2010 (KR) .................. 10-2010-0048497

(51) Int. Cl.
*F21V 29/00* (2006.01)
(52) U.S. Cl.
USPC ........................ 362/294; 362/632; 362/373
(58) Field of Classification Search
USPC ......... 362/612, 613, 632–634, 294, 373, 345; 349/58, 62–65
See application file for complete search history.

(56) References Cited

U.S. PATENT DOCUMENTS

| 2006/0285362 A1* | 12/2006 | Cho et al. ................... 362/633 |
| 2007/0041212 A1 | 2/2007 | Cho et al. |
| 2007/0103908 A1 | 5/2007 | Tabito et al. |
| 2009/0096957 A1 | 4/2009 | Hiyama et al. |
| 2009/0231297 A1 | 9/2009 | Hatakeyama |
| 2009/0316064 A1 | 12/2009 | Kono et al. |

FOREIGN PATENT DOCUMENTS

| EP | 2 037 316 A1 | 3/2009 |
| JP | 2008-305635 A | 12/2008 |
| KR | 10-0649106 B1 | 11/2006 |
| KR | 10-2007-0020823 A | 2/2007 |
| KR | 10-2008-0034717 A | 4/2008 |
| KR | 10-2010-0001881 A | 1/2010 |

* cited by examiner

*Primary Examiner* — Thomas Sember
(74) *Attorney, Agent, or Firm* — Birch, Stewart, Kolasch & Birch, LLP

(57) ABSTRACT

A backlight unit capable of emitting heat smoothly and a display device including the same are disclosed. The backlight unit includes a bottom cover, a light emitting module arranged in a predetermined area of the bottom cover, a reflective sheet provided on the bottom cover, the reflective sheet spaced apart a predetermined distance from the bottom cover, a plurality of first heat radiating members provided between the reflective sheet and the bottom cover, the plurality of the first heat radiating members spaced apart a predetermined distance from each other, a second heat radiating member arranged between the light emitting module and the first heat radiating members, and a projected part located in the second heat radiating member below the reflective sheet, the projected part supporting the reflective sheet to locate the reflective sheet spaced apart a predetermined distance from the first heat radiating members.

20 Claims, 14 Drawing Sheets

BACKLIGHT UNIT AND DISPLAY DEVICE INCLUDING THE SAME

CROSS REFERENCE TO RELATED APPLICATION

This application claims the benefit of the Patent Korean Application No. 10-2010-0048497, filed on May 25, 2010, which is hereby incorporated by reference as if fully set forth herein.

BACKGROUND OF THE DISCLOSURE

1. Field of the Disclosure

This embodiment relates to a backlight unit and a display device including the same, more particularly, to a backlight unit capable of radiating heat smoothly and efficiently, and a display device including the backlight unit.

2. Discussion of the Related Art

Among display devices, a liquid crystal display device requires a backlight unit providing lights to display images.

Such a backlight unit includes a bottom cover, a light source provided on the bottom cover to generate a light, a life guide plate disposed on a front surface of the bottom cover, adjacent to the light source, and an optical sheet attached to the light guide plate to diffuse or refract the light emitted from the light guide plate.

A display device includes a display panel arranged on a passage of the light emitted from the backlight unit.

SUMMARY OF THE DISCLOSURE

Accordingly, this embodiment is directed to a backlight unit and a display device including the same.

An object of this embodiment is to provide a backlight unit capable of emitting heat generated from a light emitting module outside smoothly, and a display device including the backlight unit.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a backlight unit includes a bottom cover, a light emitting module arranged in a predetermined area of the bottom cover, a reflective sheet provided on the bottom cover, the reflective sheet spaced apart a predetermined distance from the bottom cover, a plurality of first heat radiating members provided between the reflective sheet and the bottom cover, the plurality of the first heat radiating members spaced apart a predetermined distance from each other, a second heat radiating member arranged between the light emitting module and the first heat radiating members, and a projected part located in the second heat radiating member below the reflective sheet, the projected part supporting the reflective sheet to locate the reflective sheet spaced apart a predetermined distance from the first heat radiating members.

Here, the second heat radiating member may include a first heat radiating part provided to contact with the first heat radiating members; a second heat radiating part arranged to contact the light emitting module, and the projected part is projected from a predetermined area of the first heat radiating member.

The first heat radiating members may be arranged on the bottom cover in a first direction and the second heat radiating member may be arranged on a predetermined area of the bottom cover in a second direction orthogonal to the first direction, and the second heat radiating member may be arranged on the first heat radiating member and the projected part may be projected toward the reflective sheet from the second heat radiating member.

The projected part is arranged over right and left border lines of the first heat radiating members, with a projected portion arranged in the left border line of the first heat radiating members and a projected portion arranged in the right border line of the first heat radiating members.

The projected part may maintain non-contact with the first heat radiating members and the projected part may be partially overlapped with the first heat radiating members, and the overlapped area of the projected part with the first heat radiating members may be smaller than the other non-overlapped area with the first heat radiating members.

A forming part may be formed in an area located between neighboring two of the first heat radiating members on the bottom cover, the forming part projected toward the reflective sheet, and the projected part may include a first projected area provided in a position corresponding to the first heat radiating members; and a second projected area provided in a position corresponding to the forming part.

The second projected area may be larger than the first projected area.

In another aspect of this embodiment, a backlight unit includes a bottom cover, a light emitting module provided in a predetermined area of the bottom cover, a plurality of first heat radiating members arranged on the bottom cover at a predetermined interval, a reflective sheet arranged on the first heat radiating members, the reflective sheet spaced apart a predetermined distance from the first heat radiating members, a second heat radiating member comprising a first heat radiating part contacting with the first heat radiating members; a second heat radiating part contacting with the light emitting module; and at least one projected part projected toward the reflective sheet, connected with the first heat radiating members, the at least one projected part supporting the reflective sheet to locate the reflective sheet spaced apart a predetermined distance from the first heat radiating members.

Here, a forming part projected toward the reflective sheet may be located in an area located between neighboring two of the first heat radiating members on the bottom cover.

The light emitting module may include a module substrate and a light emitting element formed on an upper surface of the module substrate, and the first heat radiating part may contact with a side surface of the module substrate and the second heat radiating part may be contact with a lower surface of the module substrate.

The side surface of the module substrate and the first heat radiating part may be adhered by a first adhesive material and the lower surface of the module substrate and the second heat radiating part may be adhered by a second adhesive material.

The first heat radiating part of the second heat radiating member may be arranged in parallel to upper surfaces of the first heat radiating members and the second heat radiating part of the second heat radiating member may be arranged perpendicular to the upper surfaces of the first heat radiating members.

An upper surface of the projected part may be in contact with a lower surface of the reflective sheet, and a first interval may be provided between upper surfaces of the first heat radiating members and a lower surface of the reflective sheet and a second interval may be provided between an upper surface of the first heat radiating part of the second heat radiating member and the lower surface of the reflective sheet, and the first interval may be larger than the second interval.

A predetermined area of the projected part may be overlapped with the first heat radiating members.

The overlapped area of the projected part with the first heat radiating members may be 1%~49% of an entire area of the projected part.

In a further aspect of this embodiment, a display device includes a bottom cover, a light emitting module aligned to a side portion of the bottom cover, a reflective sheet provided on the bottom cover, spaced apart a predetermined distance from the bottom cover, a plurality of first radiating members provided between the reflective sheet and the bottom cover, the plurality of the first radiating members spaced apart a predetermined distance from each other, a second heat radiating member arranged between the light emitting module and the first heat radiating members, a projected part located in the second heat radiating member located below the reflective sheet, the projected part supporting the reflective sheet to position the reflective sheet spaced apart a predetermined distance from each other, a light guide plate arranged on the reflective sheet, an optical sheet arranged on the light guide plate, and a display panel arranged on the optical sheet.

It is to be understood that both the foregoing general description and the following detailed description of this embodiment are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to this embodiment, examples of which are illustrated in the accompanying drawings. Wherever possible, the same reference numbers will be used throughout the drawings to refer to the same or like parts.

As follows, this embodiment will be described in reference to the accompanying drawings.

Figure 1:
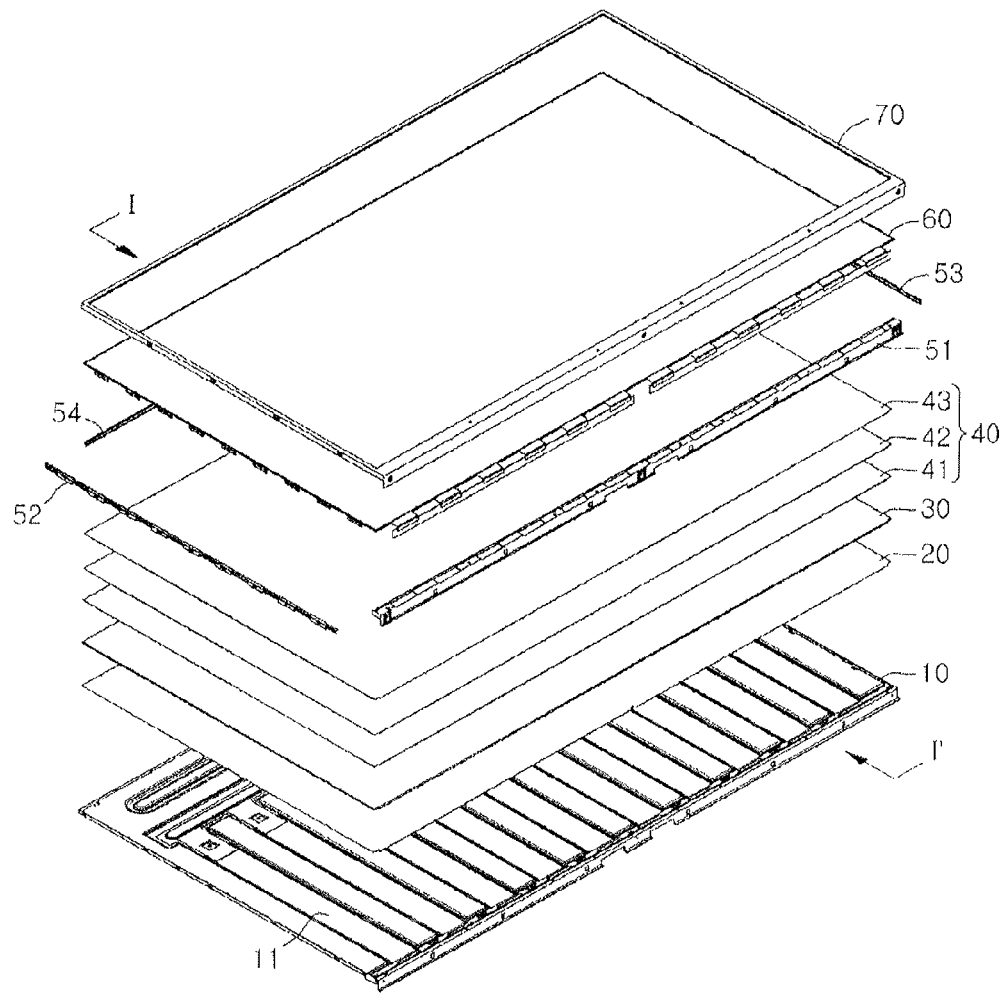
FIG. 1 is an exploded perspective view illustrating a display device according to this embodiment.

As shown in FIG. 1, a display device according to the exemplary embodiment includes a bottom cover 10, a light emitting module (not shown) provided in a predetermined portion inside the bottom cover 10, a reflective sheet 20 arranged on a front surface of the bottom cover 10, a light guide plate 30 arranged in front of the reflective sheet 20 to guide a light emitted from the light emitting module (not shown) toward the display device, an optical sheet 40 arranged in front of the light guide plate 30, a liquid crystal display 60 arranged in front of the optical sheet 40, a top cover 70 provided in front of the liquid crystal display panel 60, and a fixing member including a first fixing member 51, a second fixing member 52, a third fixing member 53 and a fourth fixing member 54 arranged between the bottom cover 10 and the top cover 70 to fix the bottom cover 10 and the top cover 70 to each other.

The light guide plate 30 is employed to guide a light emitted from the light emitting module (not shown) to be a surface light source and the reflective sheet 20 arranged in rear of the light guide plate 30 reflects the light emitted from the light emitting module (not shown) toward the light guide plate 30, to improve light efficiency.

Here, the reflective sheet 20 can be provided as auxiliary component as shown in this drawing or it can be material having high reflectance which will be coated on a rear surface of the light guide plate 30 or a front surface of the bottom cover 10.

The optical sheet 40 arranged on the front surface of the light guide plate 30 diffuses and refracts the light emitted from the light guide plate 30. Because of that, luminance and light efficiency may be improved.

The optical sheet 40 may include a plurality of elements or a single element.

In other words, the optical sheet 40 may include a first diffusive sheet 41, a prism sheet 42, a second diffusive sheet 43, or it may be an optical sheet having a diffusive sheet function and a prism sheet function.

The number and kinds of the optical sheets 40 may be selective according to required luminance characteristics.

Figure 2:
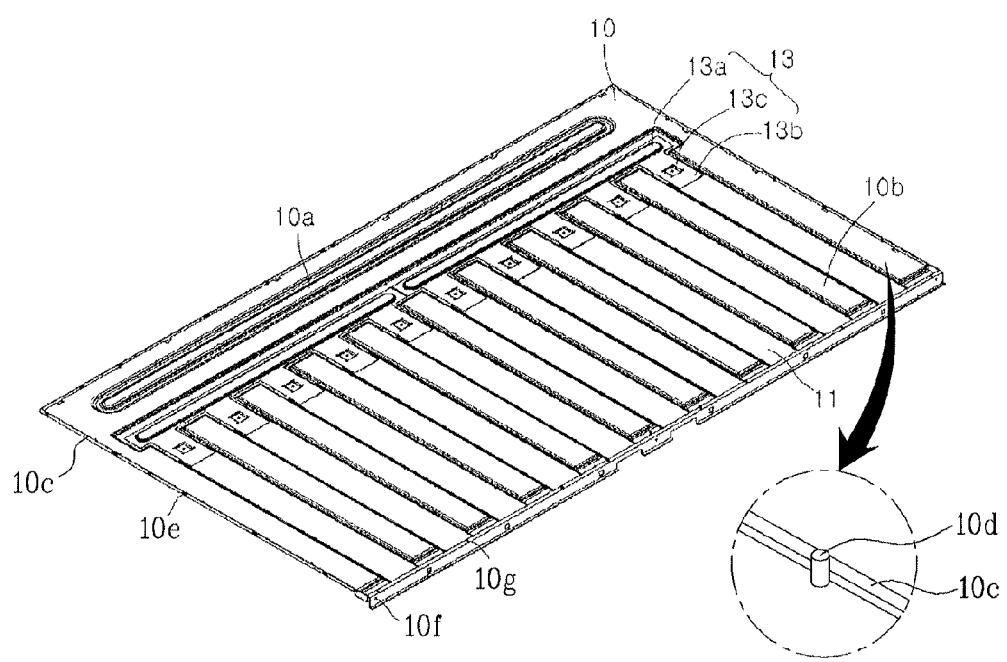
FIG. 2 is a front perspective view illustrating a bottom cover provided in a backlight unit of the display device according to the embodiment of this embodiment.

FIG. 2 is a front perspective view of the bottom cover 10 according to the above embodiment.

The bottom cover 10 can be fabricated of a metal plate type. To reinforce rigidity thereof, the bottom cover 10 may include a first forming part 10a extended along a first direction, and a second forming part 10b extended along a second direction perpendicular to the first direction. Here, the first forming part 10a and the second forming part 10b are formed convex.

The bottom cover 10 is pressed to form the first forming part 10a and the second forming part 10b.

Front surfaces of the first and second forming parts 10a and 10b include flat surfaces, respectively, and these flat surfaces may have identical heights.

This is because the reflective sheet (20, see FIG. 1) has to be arranged on the first and second forming parts 10a and 10b.

The plurality of the second forming parts 10b may be provided to reinforce rigidity, spaced apart a predetermined distance from each other.

A plurality of first heat radiating members 11 configured of heat pipes or heat sinks are installed between two of the second forming parts 10b. The first heat radiating members 11 are spaced apart a predetermined distance from each other.

The first heat radiating member 11 receives heat generated by the light emitting operation of the light emitting module (not shown) arranged in the bottom cover 10 and it radiates the heat outside through the bottom cover 10 in contact with the first heat radiating member 11.

For that, the first heat radiating members 11 may be arranged between the second forming parts 10b within the bottom cover 10, with a predetermined length, so that heat generated from the light emitting module (not shown) is radiated to the outside of the bottom cover 10 through the first heat radiating member 11.

The second forming part 10b is projected forwardly a predetermined distance. An end portion of the second forming part 10b has a slope surface, and the slope surface may be formed adjacent to the first heat radiating members 11 to make the second forming part installed smoothly.

An edge wall 10c bent forwardly from an edge of the bottom cover 10 is provided to prevent the light guide plate, the optical sheet or the reflective sheet, installed within the bottom cover 10, from separating to the outside.

A supporting part 10d is provided in a predetermined portion of the front surface of the bottom cover 10, adjacent to the edge wall 10c, and the supporting part 10d is secured to a recess (not shown) formed in an edge of the reflective sheet (20, see FIG. 1), the light guide plate (30, see FIG. 1), and the optical sheet (40, see FIG. 1) to support the light guide plate, the reflective sheet and the optical sheet.

A specific appearance and an arrangement state of the supporting part 10d and a relation with the recess will be described in detail later.

Coupling holes 10f and 10g are provided in an end portion of the bottom cover 10 to allow the fixing member (50, see FIG. 1) and the top cover (70, see FIG. 1) coupled to the bottom cover 10 by coupling members such screws.

A coupling protrusion 10e is provided in the edge wall 10c of the bottom cover 10 to allow the top cover (70, see FIG. 1) securely coupled thereto.

An H-beam (not shown) may be installed in a rear surface of the bottom cover 10 to supplement the rigidity of the bottom cover 10.

An installation member 13 is provided in the bottom cover 10 to fix the first heat radiating members 11 to the bottom cover 10.

The installation member 13 includes a body portion 13a arranged along a right and left direction, an extended portion 13b extended toward the first heat radiating members 11 perpendicularly from the body portion 13a, and a coupling hole 13c formed in the extended portion 13b to allow a coupling member to pass through to couple the first heat radiating members 11 and the bottom cover 10 to each other.

As a result, after the first heat radiating members 11 are placed on the front surface of the bottom cover 10, the extended portion 13b of the installation member 13 is placed on front surfaces of the first heat radiating members 11 and the coupling member is then inserted in the coupling hole 13c provided in the extended portion 13b. After that, the first heat radiating members 11 are fixedly arranged between the bottom cover 10 and the extended portion 13b in close contact by the securing force of the coupling member.

Figure 3:
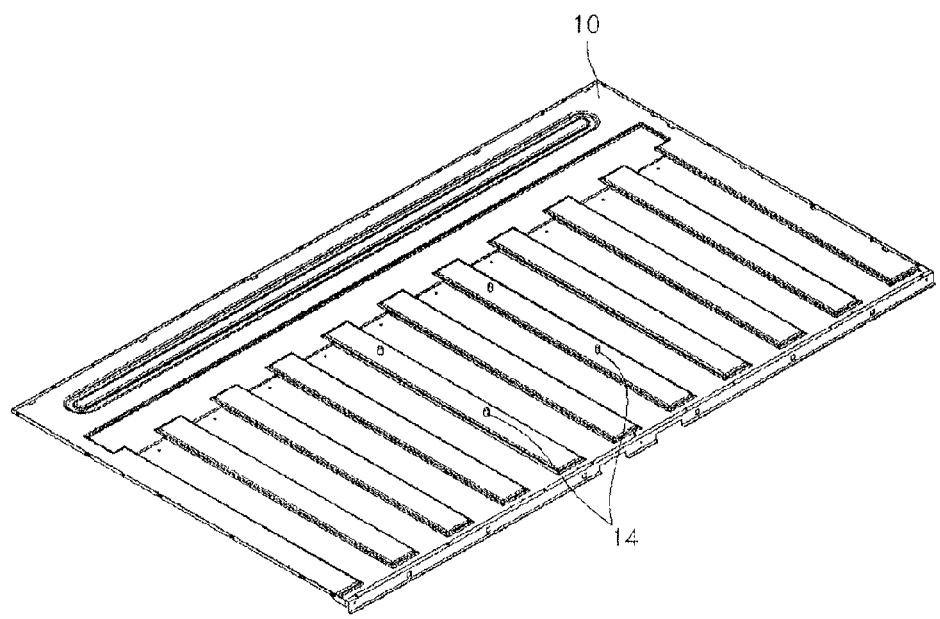
FIG. 3 is a rear perspective view illustrating the bottom cover provided in the backlight unit of the display device according to this embodiment.

FIG. 3 is a rear perspective view illustrating the bottom cover provided in the backlight unit of the display device according to this embodiment. As shown in FIG. 3, a plurality of fixing pins 14 may be provided in a rear surface of the bottom cover 10 and the fixing pins 14 fix a power device or a printed circuit board installed in the rear surface.

The fixing pins 14 are connected with the power device or PCB, to strengthen the rigidity of the bottom cover 10.

Figure 4:
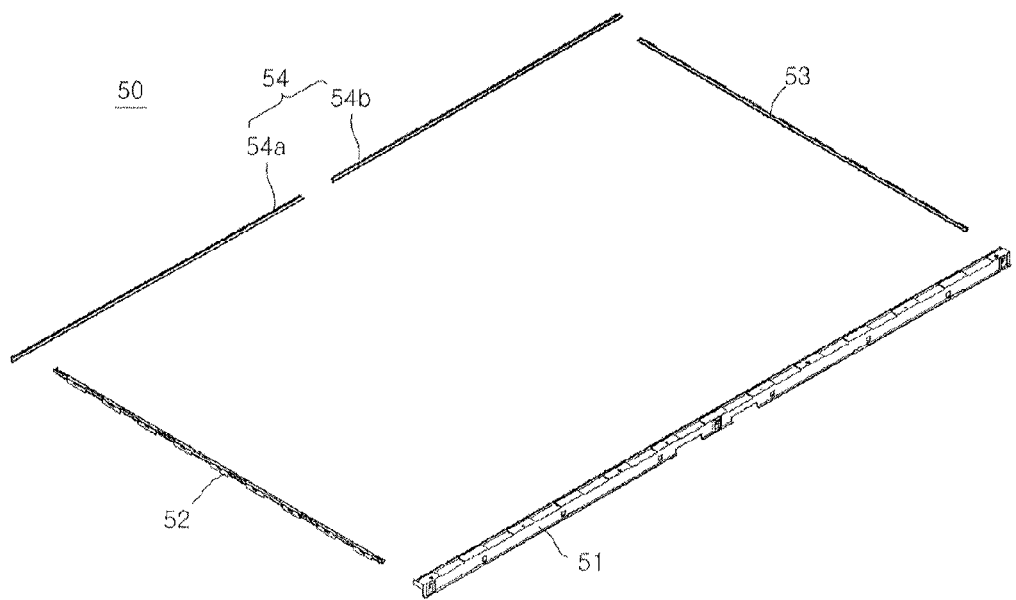
FIG. 4 is a perspective view illustrating a supporting member provided in the backlight unit of the display device according to this embodiment.

FIG. 4 is a perspective view illustrating a supporting member provided in the backlight unit of the display device according to this embodiment. As shown in FIG. 4, the fixing member 50 has a following configuration.

The fixing member 50 includes a first fixing member 51, a second fixing member 52, a third fixing member 53 and a fourth fixing member 54.

The fourth fixing member 54 may be separated into two and these two separated fourth fixing members are referenced to as numeral references 54a and 54b.

Here, the first fixing member 51 may be installed in the lower portion of the bottom cover (10, see FIG. 2) and the fourth fixing members 54 may be installed in an upper portion of the bottom cover 10.

The third fixing member 53 and the second fixing member 52 may be arranged in right and left sides of the bottom cover 10, respectively.

In an aspect of material, the first fixing member 51 may be formed of synthetic resin and the other second, third and fourth fixing members 52, 53 and 54 may be formed of metal material.

Figure 5:
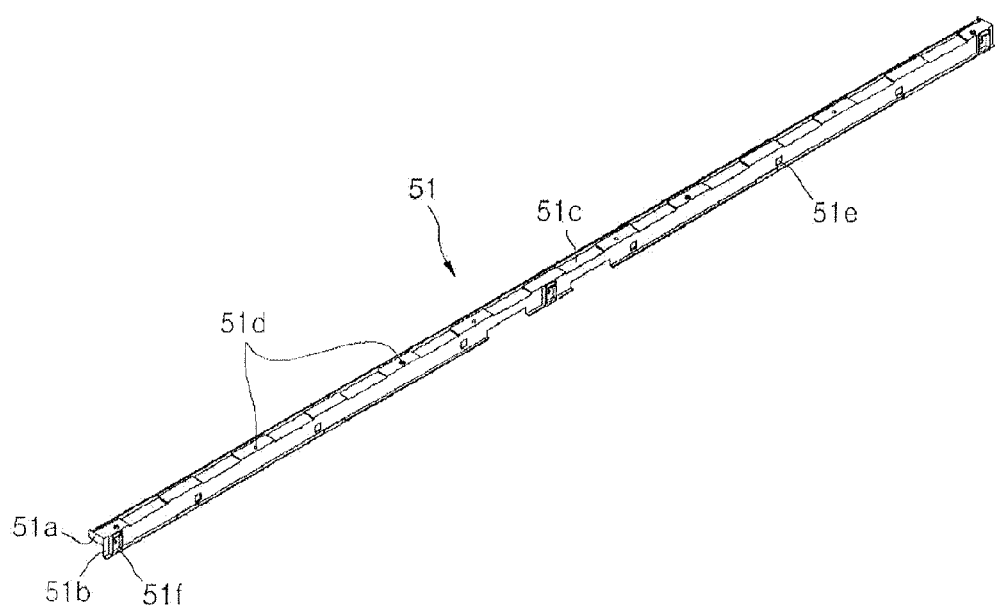
FIGS. 5 and 6 are perspective views illustrating a first supporting member provided in the backlight unit of the display device according to this embodiment.
Figure 6:
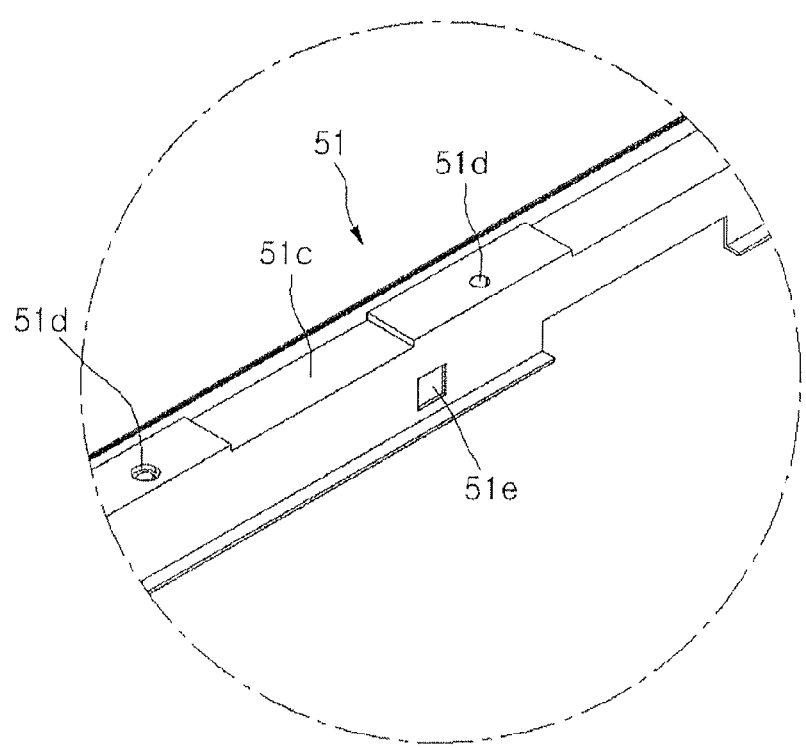

FIGS. 5 and 6 are perspective views illustrating a first supporting member provided in the backlight unit of the display device according to this embodiment. As shown in FIGS. 5 and 6, the first fixing member 51 includes a first portion 51a arranged on the bottom cover (10, see FIG. 1), the light emitting module (not shown) and the optical sheet (40, see FIG. 1) and a second portion 51b perpendicularly bent from the first portion 51a to be arranged in the bottom cover (10, see FIG. 1).

A recessed path 51c is formed in the first portion 51a and the printed circuit board (not shown) provided below the display panel (60, see FIG. 1) is arranged in the recessed path 51c to be extended outward from the bottom cover (10, see FIG. 1).

A first coupling hole 51d is formed next to the recessed path 51c to insert a coupling member such as a screw therein to couple the bottom cover (10, see FIG. 1) and the top cover (70, see FIG. 1) to each other.

A chip arranging hole 51e is formed in the second portion 51d to arrange a chip (63, see FIG. 7) secured to the PCB 62 of the display panel (60, see FIG. 7) therein. In addition, a coupling hole 51f is formed in the second portion 51b to insert a coupling member such as a screw therein to couple the bottom cover 10 and the top cover (70, see FIG. 1) to each other.

Figure 8:
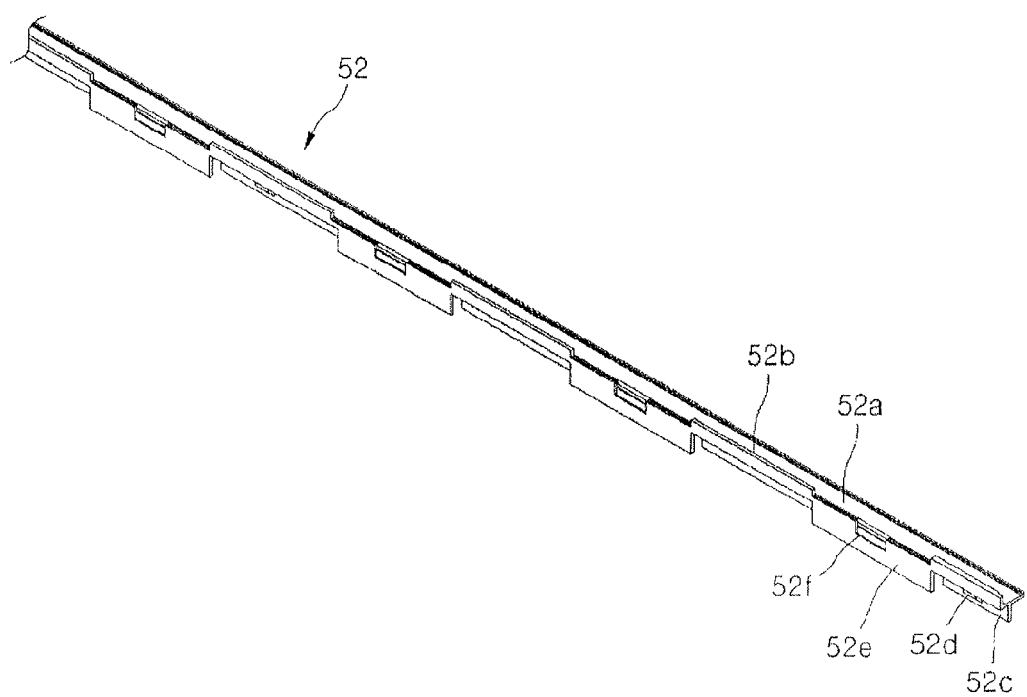
FIG. 8 is a perspective view illustrating a second supporting member provided in the backlight unit of the display device according to this embodiment.

FIG. 8 is a perspective view illustrating a second supporting member provided in the backlight unit of the display device according to this embodiment. As shown in FIG. 8, the second fixing member 52 is employed to support the reflective sheet (20, see FIG. 1), the light guide plate (30, see FIG. 1) and the optical sheet (40, see FIG. 1) to contact with the bottom cover (10, see FIG. 1) airtight.

Such the second fixing member 52 includes a first portion 52a supporting the display panel (60, see FIG. 1), a second portion 52b projected upward from the first portion 52a to prevent movement of the display panel 60, and third and fourth portions 52c and 52e projected downward from the first portion 52a, spaced apart a predetermined distance from each other alternatively, to be arranged inner and outer with respect to a side wall of the bottom cover 10, respectively.

The second portion 52b is projected upwardly from an outer edge of the first portion 52a and the fourth portion 52e is projected downward from an outer edge of the first portion 52a, located in a predetermined area of the second portion 52b.

The third portion 52c is extended downwardly from a center surface of the first portion 52a.

The second fixing member 52 may be forcedly inserted in the side wall of the bottom cover (10, see FIG. 1) by the third portion 52c and the fourth portion 52e.

In addition, a securing protrusion 52d is formed in the third portion 52c and the securing protrusion 52d is inserted in a corresponding hole formed in the bottom cover (10, see FIG. 1) to be connectedly hooked.

A chip arranging recess 52f is formed in the fourth portion 52e and the chip arranging recess 52f provides a predetermined space in which a chip (not shown) installed on a flexible PCB (64, see FIG. 7) provided in the display panel (60, see FIG. 7) can be arranged.

Figure 7:
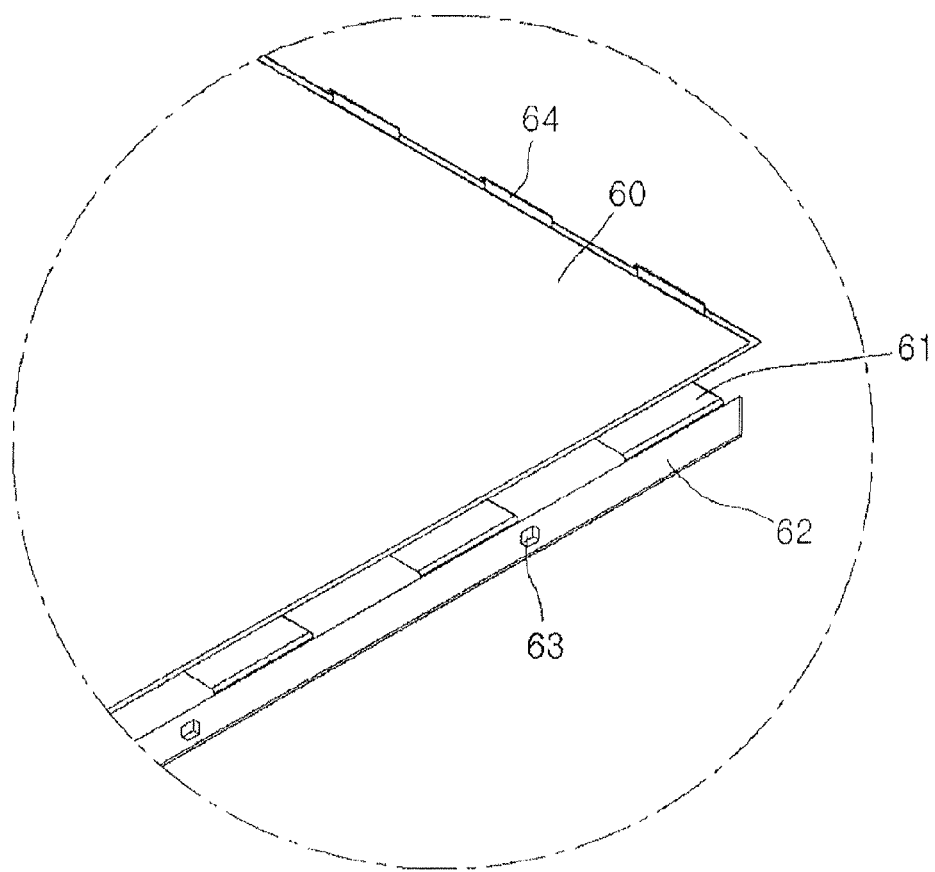
FIG. 7 is a perspective view illustrating a display panel provided in the display device according to this embodiment.

A dielectric tape or a dielectric coated layer may be formed in a predetermined area of the first portion 52a in contact with the flexible PCB (64, see FIG. 7).

The third fixing member 53 may be formed in the same structure as the second fixing member 52 and repeated description of the third fixing member 53 will be omitted accordingly.

The fourth fixing member 54 may be formed in the same or similar structure as the second and third fixing members 52 and 53 and repeated description of the fourth fixing member 54 will be omitted accordingly.

The fourth fixing member 54 is arranged in an upper portion of the bottom cover (10, see FIG. 1). Because of that, the fourth fixing member 54 does not have to be long.

In this case, the fourth fixing member 54 might be curved or damaged. The fourth fixing member 54 may be divided into two portions like 54a and 54b shown in FIG. 4. As a result, the fourth fixing member 54 may be secured to the bottom cover 10 more stably.

In contrast, the first fixing member 51 is formed with a relatively large area, compared with the fourth fixing member 54, and it is less likely to be curved or damaged. If it is formed of synthetic resin, the first fixing member 51 is more stable and it does not have to be divided into two portions.

Figure 9:
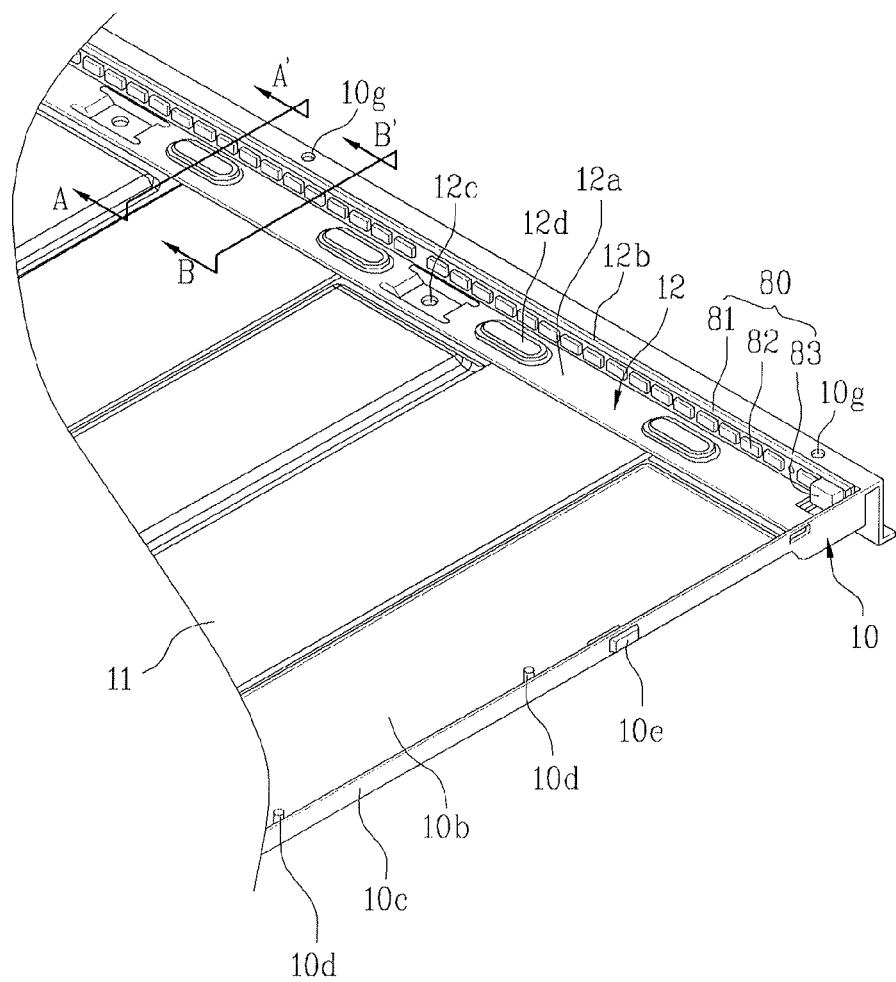
FIG. 9 is a diagram illustrating a light emitting module installed in an inner portion of the bottom cover provided in the backlight unit of the display device according to this embodiment.

FIG. 9 is a diagram illustrating a light emitting module installed in an inner portion of the bottom cover provided in the backlight unit of the display device according to this embodiment. As shown in FIG. 9, the first heat radiating members 11 are arranged on the front surface of the bottom cover 10, spaced apart a predetermined distance from each other. Adjacent to the first heat radiating members 11, the second heat radiating members 12 are arranged.

The first heat radiating members 11 may be arranged in a predetermined first direction of the bottom cover 10, preferably. The second heat radiating members 12 may be arranged in a second direction of the bottom cover 10, preferably.

That is, the second direction is orthogonal to the first direction.

A lower surface of the second heat radiating member 12 is able to surface-contact with an upper surface of the first heat radiating member 11. Because of that, heat transmission may be possible between the first and second heat radiating members 11 and 12.

The second heat radiating member 12 includes a first heat radiating part 12a in surface-contact with the first heat radiating members 11 and a second heat radiating part 12b having the light emitting module 80 arranged thereon, perpendicular to the first heat radiating part 12a.

An inserting hole 12c is formed in the second heat radiating member 12 to allow the coupling member, which couples the first heat radiating part 12a to the surface of the bottom cover 10, inserted therein.

A projected part 12d is provided in the first heat radiating part 12a to support the reflective sheet (20, see FIG. 1) together with the second forming part 10b.

The reflective sheet (20, see FIG. 1) may be spaced apart a predetermined distance from the first heat radiating members 11 by the second forming part 10b and the projected part 12d.

This is because thermal distortion of the reflective sheet (20, see FIG. 1) can be prevented by the heat of the first heat radiating members 11.

Here, the height of the projected part 12d provided in the first heat radiating part 12a is substantially equal to the heights of the first forming part (10a, see FIG. 2) and the second forming part 10b of the bottom cover 10.

Because of that, the reflective sheet (20, see FIG. 1) may be arranged on the projected part 12d of the second heat radiating member 12 and the first and second forming parts 10a (see FIG. 2) and 10b, only to form the same plane state.

The projected part 12d is projected upwardly from the first heat radiating part 12a of the second heat radiating member 12.

The plurality of the projected parts 12d may be provided and the projected parts 12d are spaced apart a predetermined distance from each other.

To maximize the contact area between the first heat radiating members 11 and the second heat radiating members 12, the projected part 12d has to have a minimized area overlapped with the first heat radiating members 11.

The light emitting module 80 is arranged on a predetermined surface of the second heat radiating part 12b possessed by the second heat radiating member 12. According to the configuration of the light emitting module 80, a module substrate 81 is arranged along the second heat radiating part 12b longitudinally and a plurality of light emitting elements 82 arranged on the module substrate 81, spaced apart a predetermined distance from each other, and a connector 83 connects the module substrate 81 with an external power device or the PCB.

FIG. 9 illustrates the light emitting element 82 configured of LED and this embodiment is not limited thereto. The light emitting element 82 may be configured of a lamp such as CCFL or an organic light emitting element such as OLED.

The number of the light emitting elements 82 may be variable according to the size of the display panel, that is, inches of the display panel (60, see FIG. 1), for desired brightness and uniform distribution of lights.

The number of the light emitting elements 82 may be 2.5~3.5 times as much as the inches of the display panel (60, see FIG. 1).

If the number of the light emitting elements 82 is less than 2.5 times or more than 3.5 times as much as the inches of the display panel (60, see FIG. 1), it is difficult to provide lights having proper brightness and to distribute them uniformly.

For example, in case of a 47-inch display panel 60, the number of light emitting elements 82 is substantially 118 to 164. According to this embodiment, the display panel 60 is 47 inch-sized and the number of light emitting elements 82 is substantially 138.

The supporting parts 10d are linearly arranged on predetermined ones of the second forming parts 10b provided in the leftmost area and the rightmost area of the bottom cover 10, spaced apart a predetermined distance from each other.

The supporting parts 10d may be arranged right next to the edge wall 10c.

Figure 10:
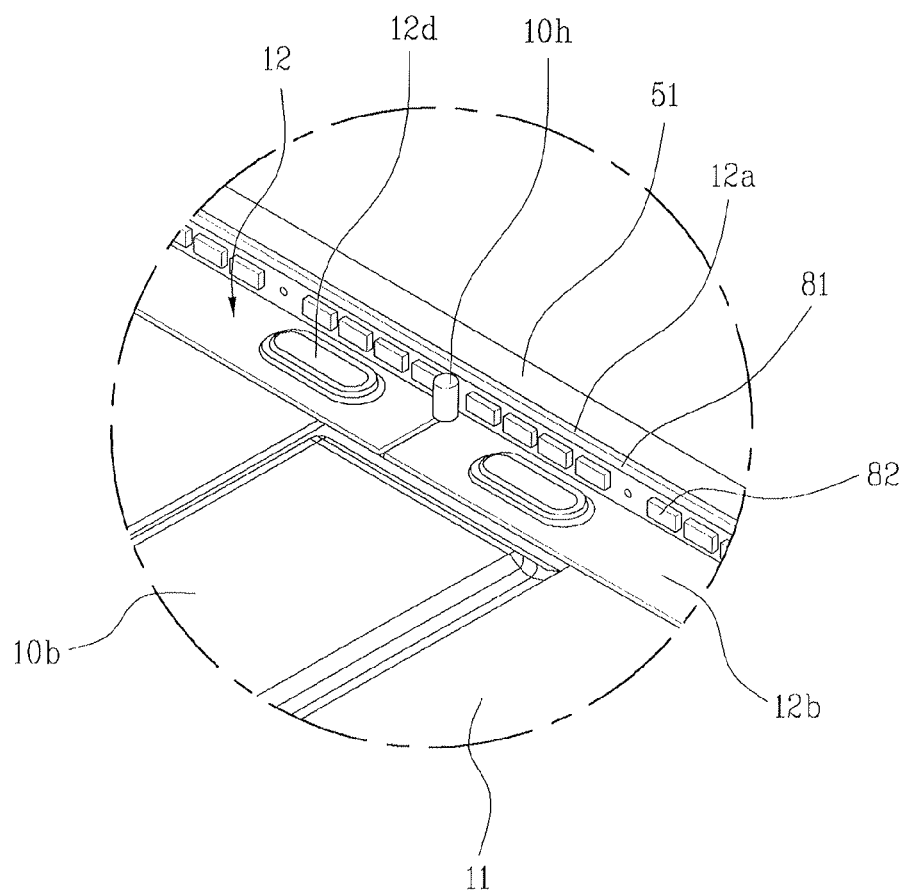
FIG. 10 is an enlarged view illustrating the light emitting module installed in the backlight unit of the display device according to this embodiment.

FIG. 10 is an enlarged view illustrating the light emitting module installed in the backlight unit of the display device according to this embodiment. As shown in FIG. 10, the supporting part 10h is provided in an inside of the bottom cover 10 and the supporting part 10h may be provided between the second heat radiating members 12.

The reason why the plurality of the second heat radiating members 12 are provided is that installation convenience has to be accomplished and the reason why the supporting part 10h is arranged between the second heat radiating members 12 is that the position of each second heat radiating member has to be indicated precisely.

In other words, a predetermined recess is formed in a side surface of the second heat radiating member 12 and the supporting part 10h is located in the recess, to position the second heat radiating member 12 precisely.

Even when the plurality of the second heat radiating members 12 are arranged adjacent to each other, the projected part 12d may be overlapped with a predetermined area of the first heat radiating members 11 and a predetermined area of the second forming part 10b or only in a predetermined area of the second forming part 10b.

This is because the surface-contact area between the first heat radiating part 12a and the first heat radiating members 11 has to be maximized.

Figure 11:
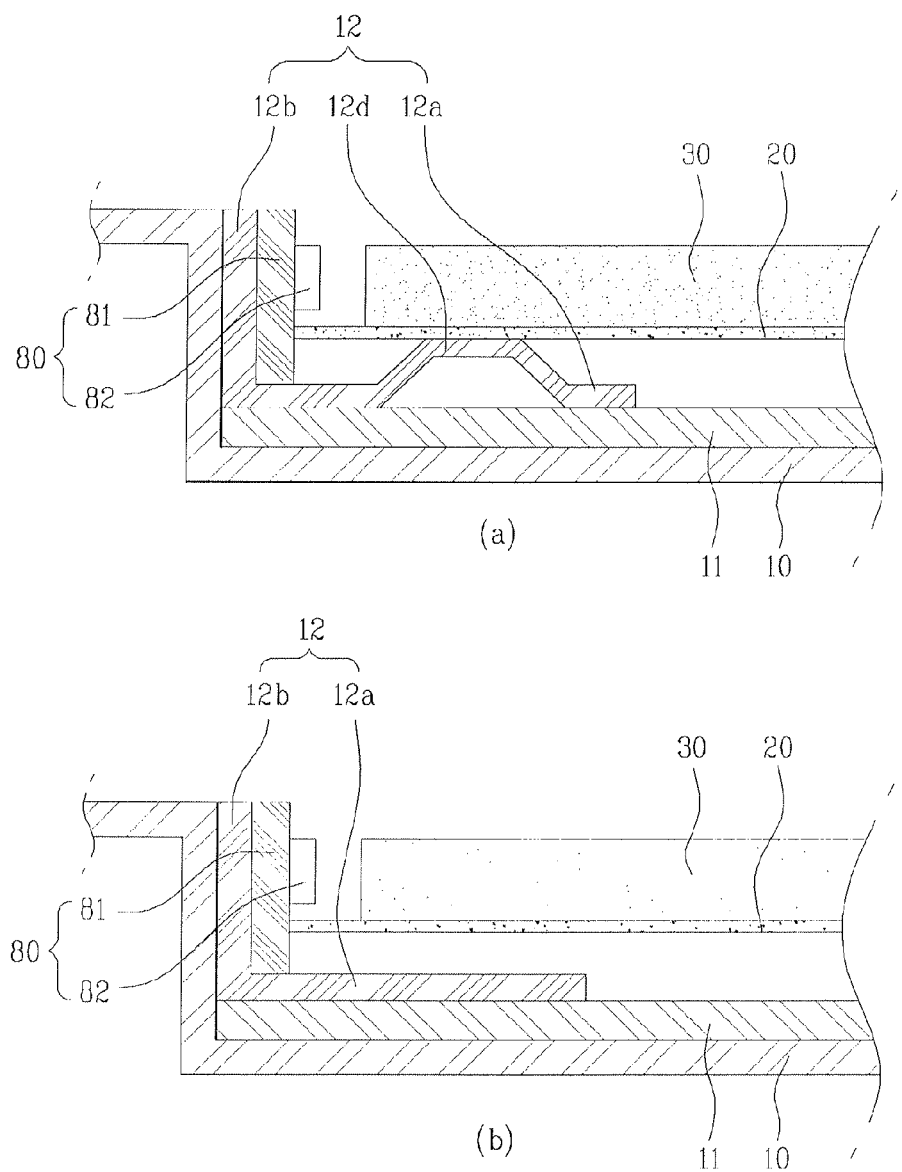
FIG. 11 is a side sectional view of cut-away A-A' and B-B' shown in FIG. 9.

FIG. 11(a) is a side sectional view of A-A' line of FIG. 9. As shown here, the reflective sheet 20 is placed on a top surface of the projected part 12d and the light guide plate 30 is placed on the reflective sheet 20, Because of that, the reflective sheet 20 is prevented from contacting with the first heat radiating members 11 directly.

The light emitting module 80 is attached to the second heat radiating parts 12b of the second heat radiating member 12 and the first heat radiating parts 12a are in surface-contact with the first heat radiating members 11 in a state of being connected with the second heat radiating parts 12b.

As a result, heat generated from the light emitting module 80 is transmitted to the second heat radiating members 12 and to the first heat radiating members 11 after that.

Here, the contact area between the first and second heat radiating members 11 and 12 has to be broadened to enable the heat transmission there between performed smoothly.

However, the projected part 12d is formed projected upwardly and because of that, a lower surface of the projected part 12d cannot contact with the first heat radiating members 11 not to contribute to the heat transmission.

As a result, it is required to minimize such an unnecessary space because the area of the projected part 12d overlapped with the first heat radiating members 11 is made to decrease the contact area between the first and second heat radiating members 11 and 12.

FIG. 11(b) is a side sectional view of a cut-away B-B' line.

Here, the reflective sheet 20 is located apart a predetermined distance from the first heat radiating parts 12a of the second heat radiating members 12, because it is supported by the projected part 12d.

Figure 12:
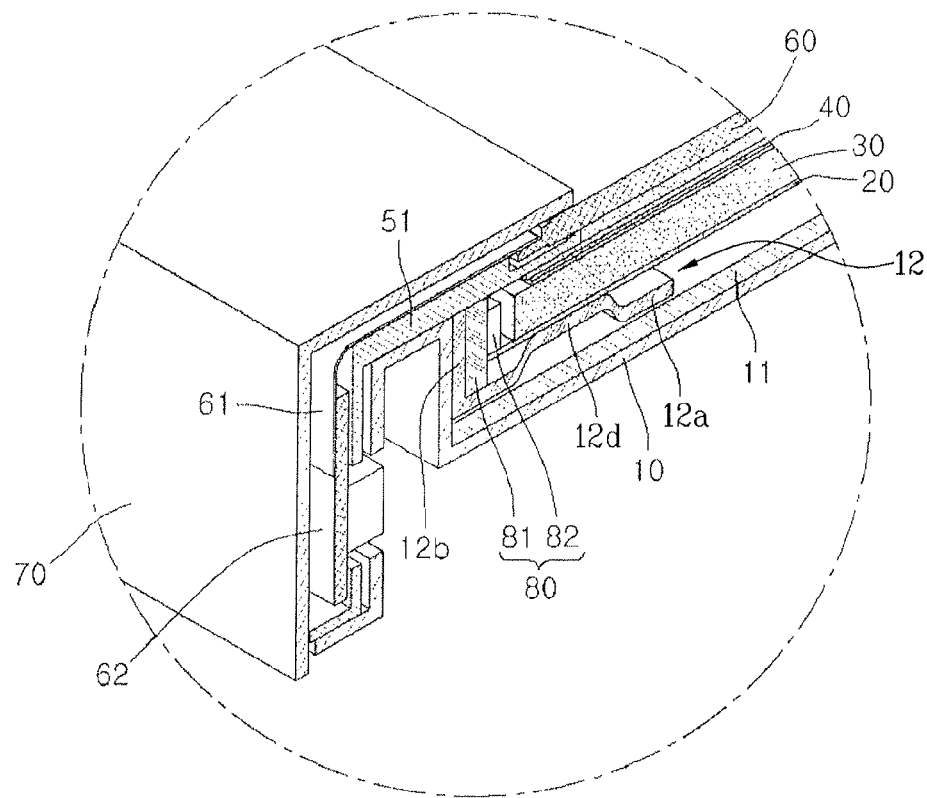
FIG. 12 is a side sectional view of a cut-away I-I' shown in FIG. 1.

FIG. 12 is a side sectional view of a cut-away I-I' shown in FIG. 1. As shown in FIG. 12, a partial section of the backlight unit and the display device according to this embodiment will be described as follows.

The first heat radiating members 11 are arranged between the second forming parts (12b, see FIG. 9) provided in the front surface of the bottom cover 10.

The second heat radiating members 12 are arranged between the light emitting module 80 and the first heat radiating members 11.

The second heat radiating members 12 are formed approximately in an 'L' shape and the first heat radiating parts 12a of the second heat radiating members 12 are in surface-contact with predetermined areas of the first heat radiating members 11.

The second heat radiating part 12b is integrally formed with the first heat radiating part 12a, perpendicular to the first heat radiating part 12a or with an angle close to a perpendicular angle with respect to the first heat radiating part 12a. The light emitting module 80 is arranged in the second heat radiating part 12b. The module substrate 81 is arranged in the second heat radiating part 12b and the light emitting elements 82 are arranged on the module substrate 81.

As a result, when lights are emitted from the light emitting elements 82 after the power is applied to the module substrate 81, heat is generated secondarily and such heat is conducted to the second heat radiating members 12. After that, the heat is moved to the first heat radiating members 11 in contact with the second heat radiating members 12, to be radiated outside.

The reflective sheet 20 is arranged beyond the second heat radiating members 12 and the first heat radiating members 11 and the light guide plate 30 is arranged on the front surface of the reflective sheet 20.

An end portion of the light guide plate 30 is adjacent to the light emitting elements 82 such that the lights emitted from the light emitting elements 82 may be guided into the light guide plate 30.

The lights transmitted into the light guide plate are moved forwardly through reflection, full-reflection and refraction.

Here, lights emitted rearward are reflected by the reflective sheet 20 to be re-transmitted into the light guide plate 30.

The optical sheet 40 is provided on the front surface of the light guide plate 30 to generate an optical phenomenon of the light and the display panel 60 is arranged in front of the optical sheet 40.

The flexible printed circuit board 61 is connected to an end of the display panel 60 and it is extended to a lower area of the backlight unit, passing the first fixing member 51. The flexible printed circuit board 61 is arranged below the bottom cover 10, connected with the printed circuit board 62.

The top cover 70 surrounds top, bottom, right and left edges of the display panel 60 and it surrounds top, bottom, right and left edges of the backlight unit including the printed circuit board 62, the flexible printed circuit board 61 and the bottom cover 10, such that it is employed to connect the backlight unit and the display panel 60 with each other.

Figure 13:
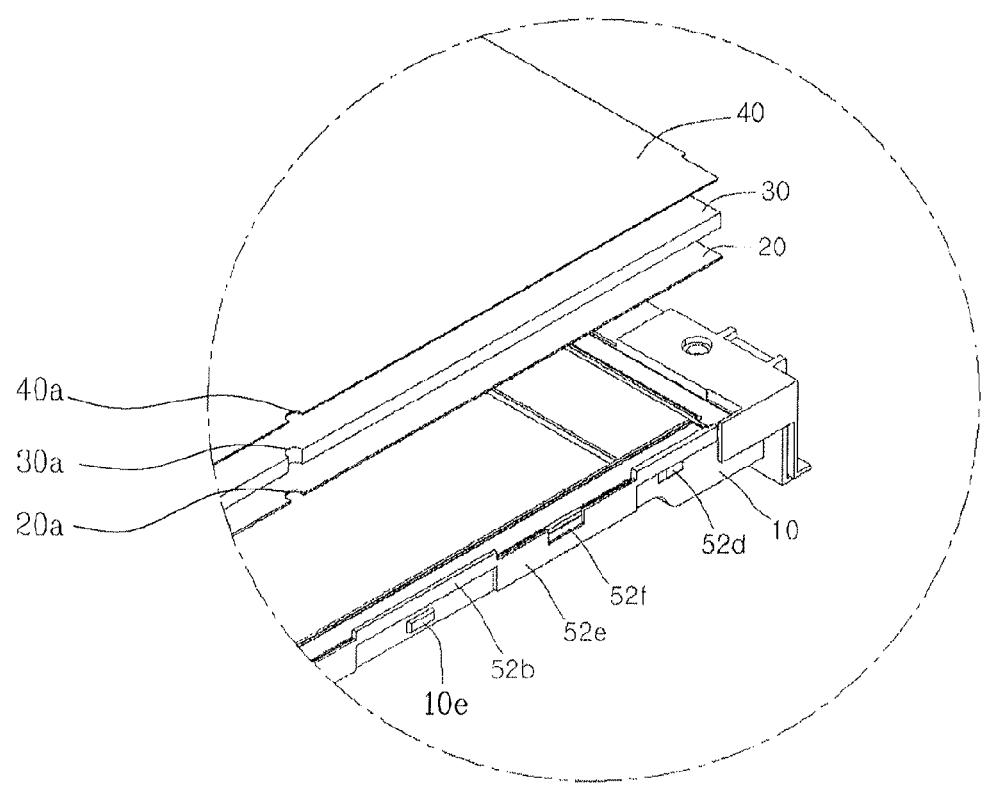
FIG. 13 is a perspective view illustrating the bottom cover, an optical sheet and a light guide plate, which are arranged in the backlight unit of the display device according to this embodiment.

FIG. 13 is a perspective view illustrating the bottom cover, an optical sheet and a light guide plate, which are arranged in the backlight unit of the display device according to this embodiment. As shown in FIG. 13, the reflective sheet 20, the light guide plate 30 and the optical sheet 40 are arranged between the second and third supporting members (52 and 53, see FIG. 4).

Recesses 20a, 30a and 40a are provided in side surface edges of the reflective sheet 20, the light guide plate 30 and the optical sheet 40 to supportingly insert the supporting parts (10d, see FIG. 9) therein.

Figure 14:
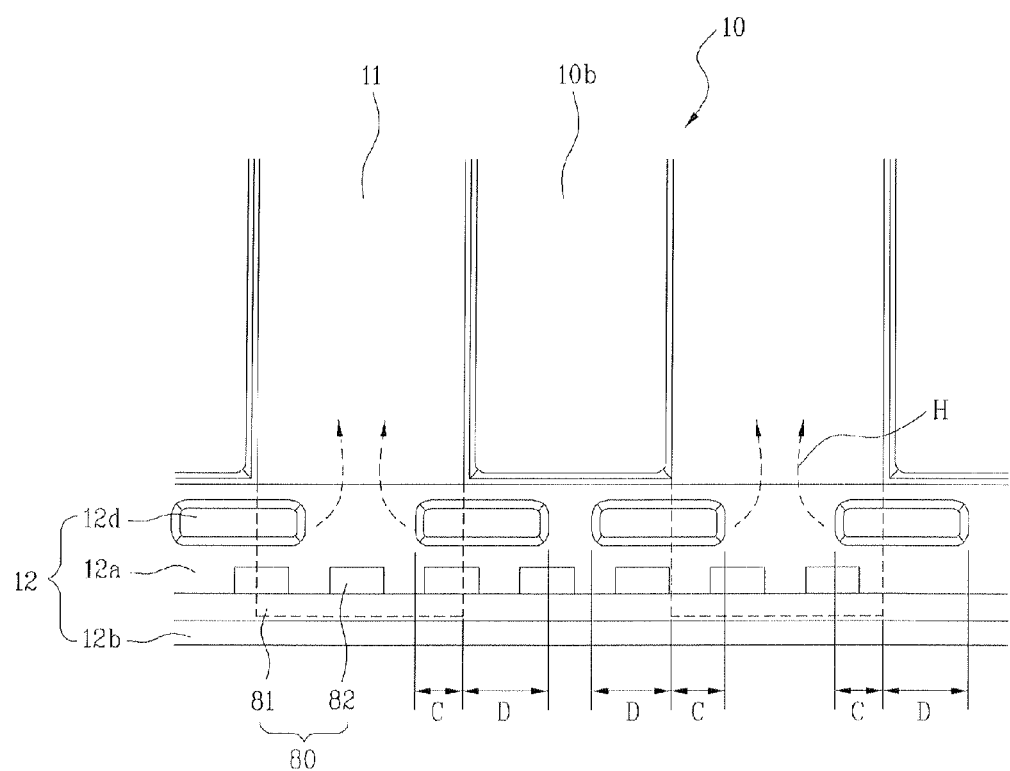
FIG. 14 is a front view illustrating the bottom cover including a heat radiating member and a light emitting module.

FIG. 14 is a front view illustrating the bottom cover including a heat radiating member and a light emitting module. As shown in FIG. 14, the second forming parts 10b and the first heat radiating members 11 are alternatively arranged on the bottom cover 10.

Below that, the second heat radiating members 12 are arranged and the projected parts 12d are spaced apart a predetermined distance from each other on the first heat radiating parts 12a.

The first heat radiating parts 12a are partially overlapped with the first heat radiating members 11, to be in surface-contact with them.

The light emitting module 80 is arranged on the second heat radiating parts 12b of the second heat radiating members 12.

As a result, the heat generated from the light emitting module 80 is transmitted to the second heat radiating parts 12b, the first heat radiating parts 12a and the first heat radiating members 11 sequentially, to be radiated outside.

As mentioned above, the projected parts 12d maintain the non-contact with the first heat radiating members 11. It is preferable that the contact area between the first heat radiating members 11 and the first heat radiating parts 12a of the second heat radiating members 12 is larger than the area of the projected parts 12d overlapped with the top surfaces of the first heat radiating members 11.

This is because the contact area between the first heat radiating members 11 and the second heat radiating members 12 has to be enlarged to secure the substantial heat transmission area.

According to the arrangement area of the projected parts 12d, there are a first projected area (C) overlapped with the first heat radiating members 11 and a second projected area (D) arranged adjacent to the second forming parts 10b. The first projected area (C) and the second projected area (D) are integrally formed with each other.

The projected parts 12d are overlapped with the right and left border lines of the first heat radiating members 11.

The second projected area (D) is larger than the first projected area (C) and it is preferable that the dead space generated by the first projected area (C) is prevented.

According to this embodiment with the above configuration, the second heat radiating part 12 includes the first heat radiating part 12a contacting with the first heat radiating member 11, the second heat radiating part 12b contacting with the light emitting module 80 and the projected part 12d projected toward the reflective sheet 20, in connection with the first heat radiating part 12a, to support the reflective sheet 20 to space the reflective sheet apart a predetermined distance from the first heat radiating member 11.

Here, the forming part 10b projected toward the reflective sheet 20 may be located in the area between neighboring two of the first heat radiating members 11.

The light emitting module includes the light emitting elements 82 formed on the upper surface of the module substrate 81. The first heat radiating part 12a may be in contact with the side surface of the module substrate 81 and the second heat radiating part 12b may be in contact with the lower surface of the module substrate 81.

Hence, the side surface of the module substrate 81 and the first heat radiating part 12a are adhered by a first adhesive material (not shown). The lower surface of the module substrate 81 and the second heat radiating part 12b may be adhered by a second adhesive material (not shown).

After that, the first heat radiating part 12a of the second heat radiating member 12 may be arranged in parallel to the upper surface of the first heat radiating member 11. Alternatively, the second heat radiating part 12b of the second heat radiating member 12 may be arranged perpendicular to the upper surface of the first heat radiating member 11.

The upper surface of the projected part 12d may be in contact with the lower surface of the reflective sheet 20. A first interval is formed between the upper surface of the first heat radiating member 11 and the lower surface of the reflective sheet 20 and a second interval is formed between the upper surface of the first heat radiating part 12a of the second heat radiating member 12 and the lower surface of the reflective sheet 20. The first interval may be larger than the second interval.

Here, the predetermined area of the projected part 12d is overlapped with the first heat radiating member 11. The overlapped area of the projected part 12d with the first heat radiating member 11 may occupy approximately 1%~49% with respect to an entire area of the projected part 12d.

The projected part 12d according to this embodiment supports the reflective sheet 20 and the ratio of the overlapped area of the projected part 12d with the first heat radiating member 11 is reduced as much as possible to maximize an effective contact area between the first and second heat radiating members 11 and 12.

As a result, the heat generated from the light emitting module 80 arranged on the second heat radiating members 12 may be transmitted to the first heat radiating members 11 smoothly and quickly. More efficient heat radiation may be accomplished advantageously.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a bottom cover;
   a light emitting module arranged in a predetermined area of the bottom cover;
   a reflective sheet provided on the bottom cover, the reflective sheet spaced apart a predetermined distance from the bottom cover;
   a plurality of first heat radiating members provided between the reflective sheet and the bottom cover, the plurality of the first heat radiating members spaced apart a predetermined distance from each other;
   a second heat radiating member arranged between the light emitting module and the first heat radiating members; and
   a projected part located in the second heat radiating member below the reflective sheet, the projected part supporting the reflective sheet to locate the reflective sheet spaced apart a predetermined distance from the first heat radiating members,
   wherein the projected part maintains non-contact with the first heat radiating members and the projected part is partially overlapped with the first heat radiating members; and
   the overlapped area of the projected part with the first heat radiating members is smaller than the other non-overlapped area with the first heat radiating members.

2. The backlight unit of claim 1, wherein the second heat radiating member comprises a first heat radiating part provided to contact with the first heat radiating members; and a second heat radiating part arranged to contact the light emitting module; and the projected part is projected from a predetermined area of the first heat radiating member.

3. The backlight unit of claim 1, wherein the first heat radiating members are arranged on the bottom cover in a first direction and the second heat radiating member is arranged on a predetermined area of the bottom cover in a second direction orthogonal to the first direction; and the second heat radiating member is arranged on the first heat radiating member and the projected part is projected toward the reflective sheet from the second heat radiating member.

4. The backlight unit of claim 1, wherein the projected part is arranged over right and left border lines of the first heat radiating members, and a projected area arranged in the left border line of the first heat radiating members is spaced apart a predetermined distance from a projected area arranged in the right border line of the first heat radiating members.

5. The backlight unit of claim 1, wherein a forming part is formed in an area of the bottom cover located between neighboring two of the first heat radiating members, the forming part projected toward the reflective sheet; and the projected part comprises a first projected area provided in a position corresponding to the first heat radiating members; and a second projected area provided in a position corresponding to the forming part.

6. The backlight unit of claim 5, wherein the second projected area is larger than the first projected area.

7. The backlight unit of claim 1, wherein the first heat radiating members are partially contacted with the second heat radiating member, and the contact area of the first heat radiating members with the second heat radiating member is larger than the area of the projected part.

8. A backlight unit comprising:
a bottom cover;
a light emitting module provided in a predetermined area of the bottom cover;
a plurality of first heat radiating members arranged on the bottom cover at a predetermined interval;
a reflective sheet arranged on the first heat radiating members, the reflective sheet spaced apart a predetermined distance from the first heat radiating members;
a second heat radiating member comprising a first heat radiating part contacting with the first heat radiating members;
a second heat radiating part contacting with the light emitting module; and at least one projected part projected toward the reflective sheet, connected with the first heat radiating members, the at least one projected part supporting the reflective sheet to locate the reflective sheet spaced apart a predetermined distance from the first heat radiating members,
wherein the projected part maintains non-contact with the first heat radiating members and the projected part is partially overlapped with the first heat radiating members; and
the overlapped area of the projected part with the first heat radiating members is smaller than the other non-overlapped area with the first heat radiating members.

9. The backlight unit of claim 8, wherein a forming part projected toward the reflective sheet is provided in an area of the bottom cover located between neighboring two of the first heat radiating members.

10. The backlight unit of claim 8, wherein the light emitting module comprises a module substrate and a light emitting element formed on an upper surface of the module substrate; and the first heat radiating part contacts with a side surface of the module substrate and the second heat radiating part contacts with a lower surface of the module substrate.

11. The backlight unit of claim 10, wherein the side surface of the module substrate and the first heat radiating part are adhered by a first adhesive material and the lower surface of the module substrate and the second heat radiating part are adhered by a second adhesive material.

12. The backlight unit of claim 8, wherein the first heat radiating part of the second heat radiating member is arranged in parallel to upper surfaces of the first heat radiating members and the second heat radiating part of the second heat radiating member is arranged perpendicular to the upper surfaces of the first heat radiating members.

13. The backlight unit of claim 8, wherein an upper surface of the projected part contacts with a lower surface of the reflective sheet; and a first interval is provided between upper surfaces of the first heat radiating members and a lower surface of the reflective sheet and a second interval is provided between an upper surface of the first heat radiating part of the second heat radiating member and the lower surface of the reflective sheet, and the first interval is larger than the second interval.

14. The backlight unit of claim 8, wherein a predetermined area of the projected part is overlapped with the first heat radiating members.

15. The backlight unit of claim 8, wherein the overlapped area of the projected part with the first heat radiating members is 1%~49% of an entire area of the projected part.

16. A display device having a backlight unit, the display device comprising:
a bottom cover;
a light emitting module aligned to a side portion of the bottom cover;
a reflective sheet provided on the bottom cover, spaced apart a predetermined distance from the bottom cover;
a plurality of first heat radiating members provided between the reflective sheet and the bottom cover, the plurality of the first heat radiating members spaced apart a predetermined distance from each other;
a second heat radiating member arranged between the light emitting module and the first heat radiating members;
a projected part located in the second heat radiating member located below the reflective sheet, the projected part supporting the reflective sheet to position the reflective sheet spaced apart a predetermined distance from each other;
a light guide plate arranged on the reflective sheet;
an optical sheet arranged on the light guide plate; and
a display panel arranged on the optical sheet,
wherein the projected part maintains non-contact with the first heat radiating members and the projected part is partially overlapped with the first heat radiating members; and
the overlapped area of the projected part with the first heat radiating members is smaller than the other non-overlapped area of the projected part with the first heat radiating members.

17. The display device of claim 16, wherein the first heat radiating members are arranged in a first direction on the bottom cover;

the second heat radiating member is arranged in a second direction orthogonal to the first direction on a predetermined area of the bottom cover; and the second heat radiating member is arranged on the first heat radiating members and the projected part is projected toward the reflective sheet from the second heat radiating member.

18. The display device of claim 16, wherein a forming part projected toward the reflective sheet is formed in an area of the bottom cover located between neighboring two of the first heat radiating members; and the projected part comprises a first projected area provided in a position corresponding to the first heat radiating members; and a second projected area provided in a position corresponding to the forming part.

19. The display device of claim 18, wherein the second projected area is larger than the first projected area.

20. The display device of claim 16, wherein the first heat radiating members are partially contacted with the second heat radiating member, and the contact area of the first heat radiating members with the second heat radiating member is larger than the area of the projected part.

\* \* \* \* \*

UNITED STATES PATENT AND TRADEMARK OFFICE
CERTIFICATE OF CORRECTION

PATENT NO.         : 8,550,665 B2
APPLICATION NO.    : 13/114776
DATED              : October 8, 2013
INVENTOR(S)        : Dong Kug Yu et al.

It is certified that error appears in the above-identified patent and that said Letters Patent is hereby corrected as shown below:

ON THE TITLE PAGE:

At item (73), correct the identity of the Assignee as follows:

Change:   "LG Innotex Co., Ltd., Seoul (KR)"

To:       --LG Innotek Co., Ltd., Seoul (KR)--.

Signed and Sealed this
Eleventh Day of March, 2014

Michelle K. Lee
*Deputy Director of the United States Patent and Trademark Office*